(12) United States Patent
Wagreich (10) Patent No.: US 10,630,572 B1
(45) Date of Patent: Apr. 21, 2020

(54) OPEN LOOP, CLOSED LOOP, REAL AND NEAR REAL-TIME COMPUTER NETWORK SYSTEM AND METHOD THEREFOR

(71) Applicant: iPayed, LLC, Peekskill, NY (US)

(72) Inventor: Jerry Wagreich, Peekskill, NY (US)

(73) Assignee: iPayed, LLC, Peekskill, NY (US)

( * ) Notice: Subject to any disclaimer, the term of this patent is extended or adjusted under 35 U.S.C. 154(b) by 0 days.

(21) Appl. No.: 16/227,984

(22) Filed: Dec. 20, 2018

Related U.S. Application Data (60) Provisional application No. 62/614,099, filed on Jan. 5, 2018.

(51) Int. Cl.

| | |
|---|---|
| *H04L 12/759* | (2013.01) |
| *H04L 12/707* | (2013.01) |
| *G06F 16/23* | (2019.01) |
| *H04L 29/06* | (2006.01) |
| *G06Q 20/08* | (2012.01) |

(52) U.S. Cl.
CPC ........ *H04L 45/028* (2013.01); *G06F 16/2379* (2019.01); *H04L 45/24* (2013.01); *H04L 67/42* (2013.01); *G06Q 20/085* (2013.01)

(58) Field of Classification Search
CPC .................................................. H04L 45/028
See application file for complete search history.

(56) References Cited

U.S. PATENT DOCUMENTS

| | | | | |
|---|---|---|---|---|
| 7,120,606 B1* | 10/2006 | Ranzini | .................. | G06Q 20/02 |
| | | | | 705/64 |
| 7,856,384 B1* | 12/2010 | Kulasooriya | .......... | G06Q 20/04 |
| | | | | 705/35 |
| 8,095,786 B1* | 1/2012 | Kshirsagar | ............ | H04L 63/164 |
| | | | | 713/151 |
| 8,910,273 B1* | 12/2014 | Fausak | .................... | H04L 67/42 |
| | | | | 709/220 |
| 2002/0065784 A1* | 5/2002 | Ranzini | .................. | G06Q 20/02 |
| | | | | 705/64 |
| 2002/0112034 A1* | 8/2002 | Feik | ........................ | H04L 63/10 |
| | | | | 709/219 |
| 2002/0143773 A1* | 10/2002 | Spicer | ..................... | H04L 47/70 |
| | | | | 707/999.01 |
| 2003/0004867 A1* | 1/2003 | Kight | ..................... | G06Q 20/02 |
| | | | | 705/39 |
| 2003/0081621 A1* | 5/2003 | Godfrey | .............. | H04L 67/2819 |
| | | | | 370/400 |

(Continued)

*Primary Examiner* — Ondrej C Vostal
(74) *Attorney, Agent, or Firm* — Leason Ellis LLP (57) ABSTRACT

A network communication system is disclosed that comprises a communicating device that communicates instruction and data signals over a communication link, a user interface device that communicates instruction and data signals related to the communicating device, an administrator server that communicates with the communicating device and the user interface device, and a transceiver device that interacts with the communicating device and generates a communication signal having transaction event data about the interaction, wherein the administrator server retains and manages a client record associated with the communicating device and a partner record associated with the user interface device. The network communication system may comprise an open loop infrastructure or a closed loop infrastructure.

13 Claims, 6 Drawing Sheets

(56) References Cited

U.S. PATENT DOCUMENTS

| | | | |
|---|---|---|---|
| 2003/0118034 A1* | 6/2003 | Furukawa | H04B 7/18582 370/400 |
| 2003/0233319 A1* | 12/2003 | Lawrence | G06Q 20/10 705/39 |
| 2004/0064480 A1* | 4/2004 | Bartlett | G06F 9/44505 |
| 2004/0193462 A1* | 9/2004 | Beasley | G06Q 30/02 705/500 |
| 2004/0193726 A1* | 9/2004 | Gatto | H04L 29/06 709/238 |
| 2005/0131811 A1* | 6/2005 | Ranzini | G06Q 10/107 705/39 |
| 2005/0144128 A1* | 6/2005 | McCoppin | G06Q 20/02 705/40 |
| 2007/0011089 A1* | 1/2007 | DeSchryver | G06Q 20/04 705/39 |
| 2007/0173322 A1* | 7/2007 | Swamy | G07F 17/32 463/42 |
| 2008/0046735 A1* | 2/2008 | Nedeltchev | H04L 63/0876 713/173 |
| 2009/0254462 A1* | 10/2009 | Tomchek | G06Q 20/24 705/30 |
| 2009/0254642 A1* | 10/2009 | Geist | H04L 51/30 709/222 |
| 2011/0126197 A1* | 5/2011 | Larsen | H04L 9/3213 718/1 |
| 2013/0003543 A1* | 1/2013 | Ludwig | H04L 47/78 370/230 |
| 2015/0017945 A1* | 1/2015 | Eckler | H04W 12/08 455/408 |
| 2015/0339671 A1* | 11/2015 | Krietzman | G06Q 20/102 705/44 |
| 2016/0302166 A1* | 10/2016 | Dang | H04W 56/001 |
| 2018/0070208 A1* | 3/2018 | Alharayeri | G06Q 50/01 |
| 2018/0205600 A1* | 7/2018 | Burton | H04L 67/1097 |
| 2019/0197620 A1* | 6/2019 | Jayaram | G06Q 40/04 |

* cited by examiner

| HEADER (305) | UI DEVICE ID (310) | COMMUNICATING DEVICE ID (315) | TRANSACTION DATA (320) |

FIG. 3A

| HEADER (325) | TRANSCEIVER DEVICE ID (330) | COMMUNICATING DEVICE ID (335) | TRANSACTION DATA (340) |

FIG. 3B

| HEADER (345) | INTERMEDIARY SERVER ID (350) | COMMUNICATING DEVICE ID (355) | TRANSACTION DATA (360) |

OPEN LOOP, CLOSED LOOP, REAL AND NEAR REAL-TIME COMPUTER NETWORK SYSTEM AND METHOD THEREFOR

CROSS REFERENCE TO RELATED APPLICATION

This application claims priority to and the benefit of U.S. Provisional Patent Application No. 62/614,099, filed Jan. 5, 2018 and titled "Open Loop, Closed Loop, Real and Near Real-Time Computer Network System and Method Therefor," which is hereby incorporated herein in its entirety.

FIELD OF THE DISCLOSURE

The present disclosure relates generally to a network system, and, more particularly to an open loop, closed loop, real and near-real time computer network communication system that facilitates communication between multiple devices over communication links.

BACKGROUND OF THE DISCLOSURE

Computer networks are ubiquitous and used by most if not all industries to communicate data and instruction signals between computers. With the anticipated disruptive implementation of fifth generation ("5G") communication networks combined with ever-increasing processor power and storage capacity, communication speeds and the number of devices that are interconnected are expected to increase substantially in the near future. Many of the communicating devices that connect to these network systems are operated by unbanked and underbanked stakeholders. There exists an unfulfilled need for a network system having a redundant architecture that meets high-availability requirements and is capable of handling exponential growth in communicating devices that connect to the network system, including connecting such communicating devices to facilitate transmission and storage of information in completely novel ways.

The disclosure provides a novel network communication system that meets the afore-noted unfulfilled needs, and provides a system and method having an architecture that meets high-availability requirements and that is capable of handling exponential growth in connectivity to communicating devices, as well as exponential growth in handling communication between the communicating devices and network components to provide a technological solution that satisfies currently unmet needs.

SUMMARY OF THE DISCLOSURE

According to an aspect of the disclosure, a network communication system is disclosed that comprises: a communicating device that communicates instruction and data signals over a communication link; a user interface device that communicates instruction and data signals related to the communicating device; an administrator server that communicates with the communicating device and the user interface device; and a transceiver device that interacts with the communicating device and generates a communication signal having transaction event data about the interaction, wherein the administrator server retains and manages a client record associated with the communicating device and a partner record associated with the user interface device. The network communication system may comprise an open loop infrastructure. The network communication system may comprise a closed loop infrastructure.

The network communication system may further comprise an exchange server that retains and manages a master admin record, wherein the admin server sends a Fedwire instruction signal to the exchange server to transfer a predetermined value from the master admin record to another record related to the interaction between the communicating device and the transceiver device.

The network communication system provides a platform that comprises: converting hard cash into a U.S. government regulated, FDIC-insured electronic cash facility for electronic payments; holding all deposited cash in iPayed eBank N.A.'s master account at the Federal Reserve Bank of New York; benefit retailers and service providers with lower electronic transaction fees; providing real-time gross settlement electronic payments through a closed loop system and near real-time electronic payments through an open loop system.

According to a non-limiting aspect of the network communication system, a client may be paid wages by direct deposit from a user interface device of an employer or paid electronically by a user interface device of the U.S. Treasury for government entitlements, tax refunds, salaries, etc., of which a set amount may be deposited into a client account managed by the admin server. Alternatively, a client may charge up a prepaid client account with cash at a user interface device of a partner site such as, for example, the U.S. Post Office.

By means of the communicating device, the client can make costless electronic payments using an app or online at a website. All payment requests may be directed to the admin server over the network and one or more communication links.

The closed loop system may comprise a Universal Real-Time Gross Settlement Electronic Currency system (URG-SEC).

The open loop system may comprise a Near Real-Time Settlement Electronic Currency system (NRSEC) utilizing, for example, Fedwire.

According to a further aspect of the disclosure, a network communication system is provided that comprises: a transceiver device that receives a first data packet signal from a communicating device over a first communication link and generates and transmits a second data packet signal over a second communication link; and an admin server that receives the second data packet signal from the transceiver device over the second communication link, updates a client record based on one or more data packets in the second data packet signal, and transmits a third data packet signal over a third communication link to an exchange server, wherein the exchange server updates a master database based on one or more data packets in the third data packet signal and transmits a fourth data packet signal, and wherein the admin server updates a database record associated with the transceiver device. The network communication system may include a closed loop infrastructure. The master database may comprise a master admin record associated with the admin server. The third data packet signal may comprise a Fedwire instruction signal to the exchange server to transfer a predetermined value from the master admin record to another record in the master database.

According to another aspect of the disclosure, a network communication system is provided that comprises: an intermediary server that receives a first data packet signal from a transceiver device over a first communication link and generates and transmits a second data packet signal over a second communication link; an admin server that receives the second data packet signal from the intermediary server over the second communication link, updates a client record based on one or more data packets in the second data packet signal, and transmits a third data packet signal over a third communication link to an exchange server, wherein the exchange server updates a master database based on one or more data packets in the third data packet signal. The network communication system may comprise an open loop infrastructure. The master database may comprise a master admin record associated with the admin server. The third data packet signal may comprise a Fedwire instruction signal to the exchange server to transfer a predetermined value from the master admin record to another record in the master database.

According to another aspect of the disclosure, a non-transitory computer readable medium is provided which has stored thereon machine executable code which, when executed by at least one computing device, causes the at least one computing device to perform steps comprising: receiving, by a transceiver device, a first data packet signal from a communicating device over a first communication link; generating, by the transceiver device, a second data packet signal; transmitting, by the transceiver device, the second data packet signal over a second communication link; receiving, by an admin server, the second data packet signal from the transceiver device over the second communication link; updating, by the admin server, a client record based on one or more data packets in the second data packet signal; generating, by the admin server, a third data packet signal; transmitting, by the admin server, the third data packet signal over a third communication link to an exchange server, wherein the exchange server updates a master database based on one or more data packets in the third data packet signal, and wherein the admin server updates a database record associated with the transceiver device.

Additional features, advantages, and embodiments of the disclosure may be set forth or apparent from consideration of the detailed description and drawings. Moreover, it is to be understood that the foregoing summary of the disclosure and the following detailed description and drawings are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Figure 1:
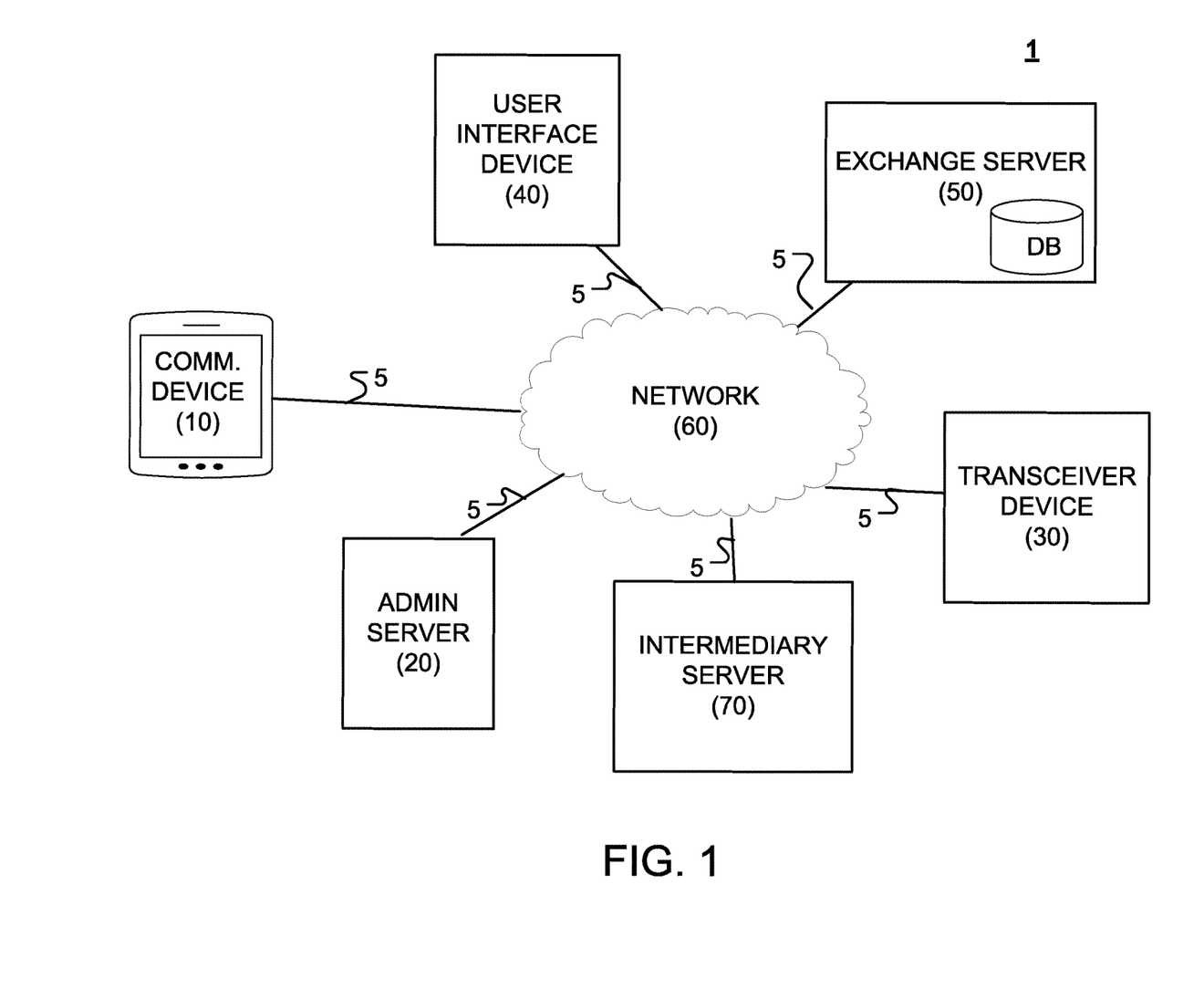
FIG. 1 shows an example of a network communication system, constructed according to the principles of the disclosure.

FIG. 1 shows an example of a network communication system 1, constructed according to the principles of the disclosure. The network communication system 1 comprises a communicating device 10, an administrator (or admin) server 20, a transceiver device 30, a user interface device 40, an exchange server 50, and a network 60, each of which can be communicatively coupled via a communication link 5 that facilitates transmission of data packets to or from each component. The network system 1 may include an intermediary server 70, which may be coupled to the network 60 via a communication link 5 in an open loop embodiment. The network communication system 1 may be implemented as an open loop embodiment or a closed loop embodiment, as described hereinbelow.

The communicating device 10 may include, for example, a telephone, a mobile phone, a smart phone, a cellular telephone, a satellite phone, a voice-over-Internet-Protocol (VoIP) phone, a computer, a computer having video and/or audio reception and production capabilities, or the like. A communication session may be initiated by the communicating device 10, which includes generating and sending a communication signal via a communication link 5 and the network 60 to the admin server 20, transceiver device 30, or user interface device 40. The communicating device 10 may generate and transmit the communication signal, which may include a digital data packet signal that conforms to, for example, the OSI model, and includes one or more data packets—each comprising a packet header and payload data. The communication signal may include instructions and data that are encapsulated, packetized and transmitted in the communication signal.

In generating the digital data packet signal, the communicating device 10 may use an application layer that includes protocols used by applications on the administrator server 20, transceiver device 30, user interface device 40, or network 60, including, for example, HTTP, FTP, SMTP, DHCP, BGP, DNS, IMAP, LDAP, MGCP, MQTT, NNTP, NTP, POP, ONC/RPC, RTP, TRSP, RIP, SIP, SNMP, SSH, Telnet, TLS/SSL, XMPP, etc. The data encoded according to the application layer protocols may be encapsulated into transport layer protocol units, such as, for example, TCP, UDP, DCCP, SCTP, RSVP, etc. The transport layer protocol units may be encapsulated into internet layer protocol units, such as, for example, IP (IPv4, IPv6), ICMP, ICMPv6, ECN, IGMP, IPsec, etc. The internet layer protocol units may be encapsulated into link layer protocol units and transmitted across a channel via the communication link 5 and network 60.

The user interface device 40, transceiver device 30, and admin server 20 may be configured to receive the communication signal from the communicating device 10 and decapsulate and depacketize the signal into instructions and data that may be used by, for example, one or more applications in the receiving device, as described herein.

The user interface device 40, transceiver device 30, admin server 20, intermediary server 70, or exchange server 50 may generate and transmit communication signals in a manner similar to that discussed above with regard to the communicating device 10. The user interface device 40, transceiver device 30, administrator server 20, exchange server 50, network 60, and intermediary server 70 may each include one or more computers or servers. The user interface device 40 may include, for example, a kiosk, an automated teller machine (ATM), or the like, which may be configured to receive cash and capture information about the client by, for example, scanning a QR code (as discussed below) on a card or on the communicating device 10, receiving a radio frequency identification (RFID) signal, or any other means that can securely and accurately communicate information to identify the client or the communicating device 10. The user interface device 40 may include an image pickup device (not shown) that can capture an image of, for example, a QR code on the card or on the communicating device 10.

The communication signal may be compressed, encrypted, or otherwise processed before being transmitted across the communication links 5 and network 60. The communication link(s) 5 can include a secure transmission medium such as, for example, a virtual private network (VPN) channel.

Figure 2:
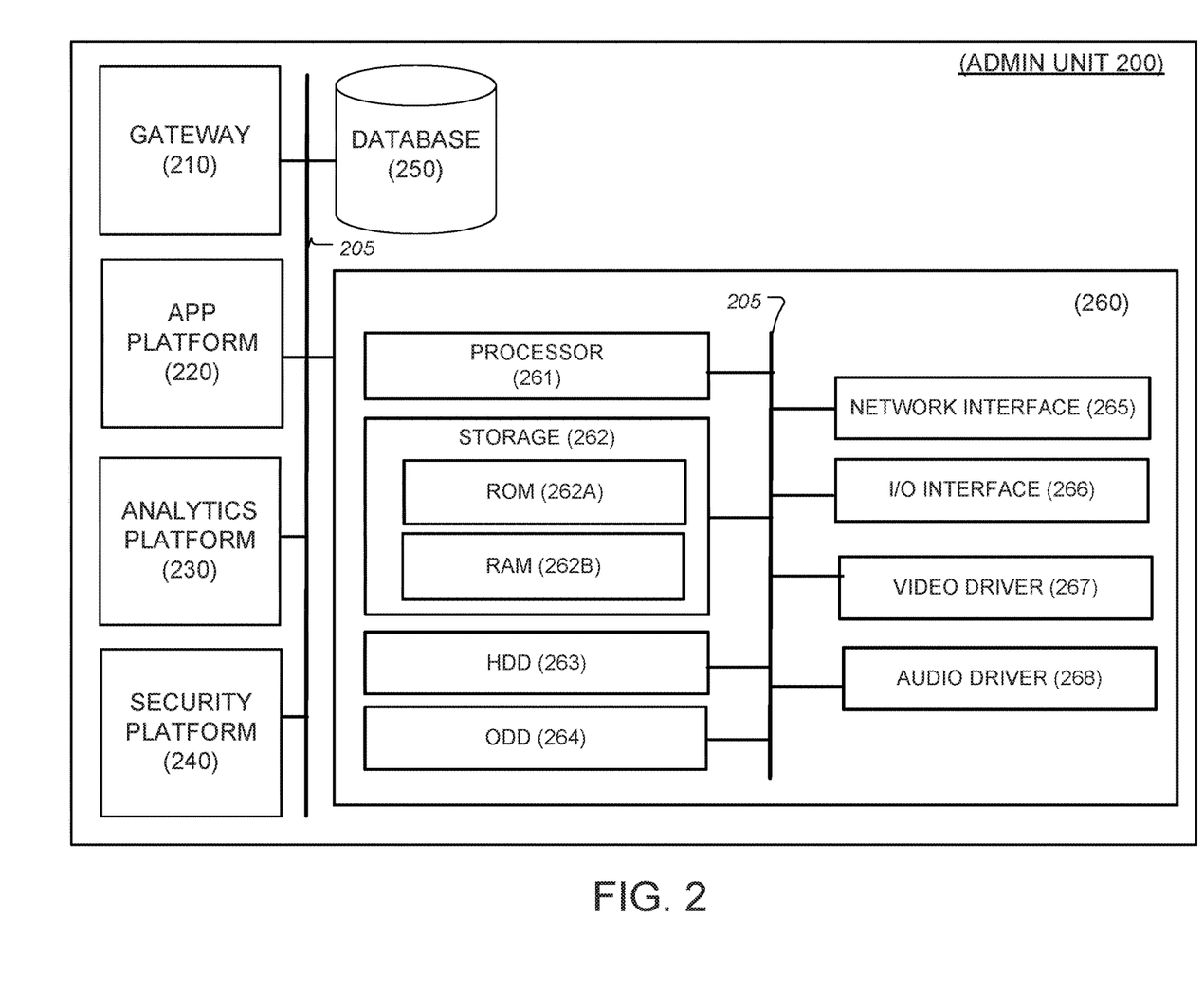
FIG. 2 shows a block diagram of an example of an admin unit that may be included in the network communication system of FIG. 1.

FIG. 2 illustrates a block diagram of an example of an admin unit 200 that can be included in the admin server 20. The admin unit 200 is operable to execute the disclosed architecture, according to the principles of the disclosure. While some aspects of the disclosure have been described herein in the general context of computer executable instructions that may run on one or more computers, those skilled in the art will recognize that the disclosure also can be implemented in combination with other program modules and/or as a combination of hardware and software. Generally, program modules include routines, programs, components, data structures, and the like, that perform particular tasks or implement particular data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the disclosure may be practiced in distributed computing environments where certain tasks are performed by remote processing devices that are linked through a communications network. In a distributed computing environment, program modules can be located in both local and remote memory storage devices.

In FIG. 2, the admin unit 200 is configured to implement the various aspects of the disclosure. The admin unit 200 may include a gateway 210, an application (or app) platform 220, an analytics platform 230, a security platform 240, a database 250, and a core unit 260, each of which can be a device or a module that is separate from the core unit 260 (discussed below), or which can be integrated with the core unit 260, and all of which may be communicatively coupled to a bus 205 via communication links.

The system bus 205 can be any of several types of bus structures that may further interconnect to a memory bus (with or without a memory controller), a peripheral bus, and a local bus using any of a variety of commercially available bus architectures.

The core unit 260 may include a processor 261. The processor 261 can be any of various commercially available processors. Dual microprocessors and other multi-processor architectures may also be employed as the processor 261.

The core unit 260 includes a computer-readable medium that may hold executable computer code (or instructions) that, when executed by the processor 261, causes the steps, processes and methods described herein to be carried out. The computer-readable medium may be provided in the storage 262, HDD 263, and/or ODD 264.

The storage 262 includes a read only memory (ROM) 262A and a random access memory (RAM) 262B. A basic input/output system (BIOS) may be stored in the non-volatile memory 262A, which may include, for example, a ROM, an EPROM, an EEPROM, or the like. The BIOS may contain the basic routines that help to transfer information between elements within the core unit 260 and, more generally, the admin server 20 such as during start-up. The RAM 262B may include a high-speed RAM such as static RAM for caching data.

The core unit 260 includes an internal hard disk drive (HDD) 263, such as, for example, an enhanced integrated drive electronics (EIDE) drive, a serial advanced technology attachments (SATA) drive, or the like, and an optical disk drive (ODD) 264 (e.g., for reading a CD-ROM disk (not shown), or, to read from or write to other high capacity optical media such as the DVD). The HDD 263 may be configured for external use in a suitable chassis (not shown). The HDD 263 and ODD 264 can be connected to the system bus 205 by a hard disk drive interface (not shown) and an optical drive interface (not shown), respectively. The hard disk drive interface (not shown) may include a Universal Serial Bus (USB) (not shown), an IEEE 1394 interface (not shown), and the like, for external applications.

The HDD 263 and/or ODD 264, and their associated computer-readable media, may provide nonvolatile storage of data, data structures, computer-executable instructions, and the like. The HDD 263 or ODD 264 may accommodate the storage of any data in a suitable digital format.

A number of program modules can be stored in the HDD 263, ODD 264, or RAM 262B, including an operating system (not shown), one or more application programs (not shown), other program modules (not shown), and program data (not shown). Any (or all) of the operating system, application programs, program modules, and program data may be cached in the RAM 262B.

The core unit 260 may include a network interface 265. The network interface 265 may be connected to the network 60 over a communication link 5 (shown in FIG. 1). The network interface 265 may include a wired or a wireless communication network interface (not shown) and/or a modem (not shown). When used in a local area network (LAN), the admin server 20 may be connected to the LAN network through the wired and/or wireless communication network interface; and, when used in a wide area network (WAN), the admin server 20 may be connected to the WAN network through the modem. The network 60 may include a LAN, a WAN, or the like. The modem (not shown) can be internal or external and wired or wireless. The modem may be connected to the system bus 205 via, for example, a serial port interface (not shown).

The core unit 260 includes an input/output (I/O) interface 266. The core unit 260 may receive commands and data from a user via the I/O interface, which may be communicatively coupled to one or more input/output devices (not shown), including, for example, a keyboard, a mouse, a pointer, a microphone, a speaker, a display, or the like. The received command and data may be forward to the processor 261 from the I/O interface 266 as instruction and data signals via the bus 205.

A display device (not shown) may be connected to the system bus 205 via the I/O interface 266. The display device may be connected to the video driver 267 via the system bus 205. The display device may reproduce image signals to be viewed and/or interacted with by the user.

The speaker (not shown) may be connected to the system bus 205 via the I/O interface 266. The speaker may be connected to the audio driver 268 via the system bus 205. The speaker may reproduce sound signals to be heard and/or interacted with by the user.

The gateway 210 may be connected to the system bus 205. The gateway 210 may be configured to handle messaging, device integration, and communication integration, such as, for example, Fedwire® communication integration. The messaging may comply with communication standards, such as, for example, the ISO 20022 messaging standard. The gateway 210 may facilitate communication between the admin server 20 and, for example, one or more data centers (such as, for example, SOC-3, ISO/IEC 27001, or the like, certified secured data centers) (not shown) that have a redundant architecture that meets high-availability requirements and that is capable of handling substantial growth (e.g., exponential growth) as needed.

The application (or app) platform 220 may include one or more apps and/or devices that are used by the network communication system 1 (shown in FIG. 1) to execute aspects of the architecture described herein. The app platform 220 may include a client onboarding app that may handle aspects of client onboarding, including, for example, receiving and downloading client identification information from the communicating device 10 (shown in FIG. 1) and creating a user account and user record. The app platform 220 may include one or more downloadable apps that can be downloaded and installed on the communicative device 10.

The client identification information may include government identification (e.g., a passport number, a social security number, a driver license number, or any government authorized or approved identification that may uniquely identify an individual or an entity (e.g., a business)), biometric data (e.g., facial image, fingerprint, voice signature, written signature, retina image, or the like), user information (e.g., email address, mail address, telephone number, credit card number, user's name, or the like), password, or the like. During the onboarding process, a communication session may be established between the communicating device 10 and the admin server 20 (for example, via gateway 210), and the communicating device 10 may send communication signals that include client identification information to the admin server 20, which may be processed by the app platform 220 to collect and process the information necessary to create or edit a user account and a user record for the client associated with the communicating device 10. The user record (including user account) may be stored locally in the admin server 20, such as, for example, in the database 250.

According to a non-limiting embodiment of the disclosure, the user record may include the client identification information, real-time information about the client's account, historical data for the client's account, and the like. The real-time information may include the current account balance, identification information (e.g., device serial number, IP address, MAC number, and the like) for the communicating device 10 associated with the user account, the contact information for the user account (e.g., email address, mobile phone number, etc.), and the like. The historical data for the user account may include historical data for the account balance, the client's transaction history (including, e.g., date of each transaction event, time of each transaction event, identification of the transceiver device 30 for each transaction event, identification of the intermediary server 70, identification of the third party acquirer/merchant bank for each transaction event, identification of the communicating device 10, identification of the user interface device 40, details regarding each transaction event (e.g., description of each item purchased/sold, price of each item, total number of items purchased/sold, taxes paid on each item(s) purchased/sold, etc.)), and the like.

The app platform 220 may include an AML/BSA compliance app that consolidates some or all aspects of BSA/AML compliance, including, for example, risk assessment, internal controls (e.g., suspicious activity monitoring), testing, training, and the like, and that manages risk assessment and implementation of controls across the network communication system 1 (shown in FIG. 1). For instance, the AML/BSA compliance app may communicate with the analytics platform 230 and/or security platform 240 and determine an overall risk exposure to a particular client carrying out a transaction on the network communication system 1. The AML/BSA compliance app may include numerous anti-money laundering safeguards coded into the app and configured to create and communicate red flag warnings when suspicious activities occur.

The app platform 220 may include, for example, a Fedwire® communication interface app that facilitates communication (e.g., via gateway 210) between the admin server 20 and the Fedwire® Funds Service at, for example, the exchange server 50 (shown in FIG. 1). The app platform 220 can facilitate communication with FedLine® Solutions, including FedLine Advantage®, FedLine Command®, FedLine Direct®, FedLine Web®, FedMail®. The app platform 220 may facilitate communication with the Fedwire® Securities Service, which may be provided at the exchange server 50. The exchange server 50 may include a server maintained and operated by the United States Federal Reserve System. The exchange server 50 may include and maintain a master database comprising master admin accounts associated with the admin device 20. The master database may comprise merchant/bank accounts associated with the transceiver device 30 and/or intermediary server 70. By way of the Fedwire® communication interface app, the admin server 20 can manage and handle financial transactions with the exchange server 50, including transactions, for example, between one or more communicating devices 10, one or more user interface devices 40, one or more transceiver devices 30, and/or one or more intermediary servers 70, including, for example, cash deposit conversions and electronic payment transactions. The app platform 220 may facilitate transmission of data packets configured to conform with ISO 20022 payments messages, or the like.

The analytics platform 230 may include one or more scalable complex event processing engines, such as, for example, data lake and reporting/analytics tools, that execute analytics on operational data (e.g., transactional data used by a banking system, retailer, ERP application, or the like), analytical data (e.g., information kept in data warehouses (not shown), database 250, database DB in exchange server 50 (shown in FIG. 1), or the like), streaming data (e.g., data produced by sensors on communicating devices 10, data produced by communication devices 10, data from IoT devices), and the like, which may exist on, or be communicated from/to or between the various devices in the network communication system 1 (including, e.g., the communicating devices 10, transceiver devices 30, user interface devices 40, exchange server 50, or intermediary server 70).

For instance, the analytics platform 230 may include data lake analytics reporting tools such as, for example, Microsoft® Azure, IBM® Analytics, or the like. In the case of Microsoft® Azure, for example, the analytics platform 230 may include cloud-based service tools such as SQL dtabases, HDlnsight (HBase), DocumentDB, Tables, and the like (collectively, the "operational data tools"), Azure Machine Learning, SQL Data Warehouse HDlnsight (Hive, Spark, etc.), Data Lake Analytics, Data Lake Store, Data Factory, Blobs, and the like (collectively, the "analytical data tools"), and Azure Stream Analytics, HDlnsight (Storm, Spark Streaming), IoT Hub, Event Hubs, and the like (collectively, the "streaming data tools"). The analytics platform 230 may be configured to provide a common user interface for diverse data, analyze large amounts of relational and/or unstructured data, provide accurate and efficient predictions, and use historical data to predict behavior in the network communications system 1.

The security platform 240 may include biometrics, cryptography, blockchain, or other similar technologies to ensure secure communications and transactions in the network communications system 1. For instance, the security platform 240 may include biometrics technology that may implement biometric analysis (e.g., fingerprint analysis, facial recognition, voice authentication, retinal image analysis, and the like) to identify and authenticate clients via, for example, the communicating device 10 (shown in FIG. 1). In this regard, biometrics collected by and received from the communicating device 10 may be compared against biometrics data for the client in the user record stored in, for example, the database 250 to authenticate the identity of the user of the communicating device 10.

The security platform 240 may implement cryptography to encode communication signals (including instruction and data signals) and ensure safe and reliable transmission of communication signals between the various devices and platforms in the network communication system 1.

The security platform 240 may implement blockchain technology to ensure safe and reliable retention of records in the network communication system 1, including user records.

The security platform 240 may include security control technologies, such as, for example, identity and access management tools, audit and intrusion detection tools, firewalls, and the like.

As of the writing of this description, about 28% of U.S. residents (more than ninety million people) are either unbanked (they have no checking or savings account) or underbanked (they have some relationship with an insured financial institution but still rely on minimally regulated alternative financial service providers, such as check-cashing storefronts or payday lenders). The network communications system 1 described herein may reach and meet the needs of millions of unbanked and underbanked individuals. In this regard, the network communication system 1 may implement an open loop infrastructure (shown in FIG. 5) that provides near real-time transaction processing or closed loop infrastructure (shown in FIG. 6) that provides real-time transaction processing. The open and closed loop infrastructures may be nearly identical, except that the admin server 20 may maintain a merchant account and merchant record associated with the transceiver device 30 in the closed loop embodiment; whereas, the admin server 20 in the open loop embodiment may not have any information associated with the transceiver device 30, but, instead, may have information about the intermediary server 70 that may be associated with the acquirer/merchant bank account information of a financial entity such as a bank that may manage financial transactions on behalf of the transceiver device 30 (and/or user thereof, such as, e.g., a merchant).

Referring to FIGS. 1 and 2 concurrently, by means of the communicating device 10, a user may access a client onboarding app that may be running on the admin server 20 (or an onboarding app that was previously downloaded and installed in the communicating device 10) to create a user account that may be stored and maintained by the admin server 20 (e.g., in the database 250). As part of the onboarding process, the client may interact with the communicating device 10 to provide client information, including, for example, identification information, biometric data, password information, and the like. For instance, the client may be prompted to press on the home button (not shown) of the communicating device 10 so as to capture the client's fingerprint, or take a selfie using the camera (not shown) in the communicating device 10, or the like. The admin server 20 may collect and process the information from the communicating device 10 necessary to create a user account and user record for the client associated with the communicating device 10 and the client information, as well as the communicating device itself. The admin server 20 may then maintain and manage the user account and user record for the client associated with the communicating device 10. The user account and user record may be stored in, for example, the database 250 (shown in FIG. 2). The user record may include the user account.

A summary of the user account may be maintained and communicated to the communicating device 10 to be displayed to the client in real-time (closed loop, shown in FIG. 6) or near real-time (open loop, shown in FIG. 5), at predetermined time intervals, or at the request of the communicating device 10. The user record includes a plurality of fields, including a field that includes information that can be used by the admin server 20 to locate the user record based on client data received from the communicating device 10, transceiver device 30, user interface device 40 or intermediary device 70.

According to a non-limiting embodiment of the disclosure, a card (not shown) can be provided to the client that contains client reference data which can be mapped to a user record in the admin server 20. The card may be configured to be similar to a credit card. The client reference data may be encoded on the card as a machine-readable image (e.g., a barcode, QR scan code, etc.), a chip, a magnetic strip, or the like. The card can be a Common Access Card (CAC).

Alternatively, the client reference data can be downloaded to the communicating device 10, which can reproduce the client reference data as a Near Field Communication (NFC) signal, a radio frequency identification (RFID) signal, a displayable image (e.g., QR scan code) that can read by another device (e.g., a transceiver (not shown) or image pickup device in the user interface 40) and translated into a binary signal, or the like.

The client reference data may include an RFID signature, a number, a hash, an alphanumeric character, a symbol, or the like, that can be used as a pointer to a specific user record in the admin server 20. Each user record in the admin server 20 may include an index field, which may be mapped to unique client reference data that is provided on the card or the communication device 10. The client reference data can be received, by the admin server 20, in a communication signal from, for example, the user interface device 40, parsed by the admin server 20 from the data packets in the communication signal and used by the admin server 20 to locate and retrieve a user record for the particular client associated with the client reference data.

Still referring to FIGS. 1 and 2 concurrently, a user interface device 40 may communicate with the admin server 20 to create or edit a partner account and a partner record that may be stored and maintained by the admin server 20 (e.g., in the database 250). As part of the process, the user interface device 40 may interact with the admin server 20 to provide partner information, partner login information, password information, and the like, so as to create and manage the partner account and partner record.

According to a non-limiting embodiment of the disclosure, the user interface device 40 may include a computer of a government entity (e.g., the U.S. Post Office, or the like), a commercial entity (e.g., an employer, a company, a retailer, or the like), or an individual (e.g., a person). The admin server 20 may collect and process the information from the user interface device 40 necessary to create and manage the partner account and partner record for the entity associated with the user interface device 40. The partner record may include partner entity identification information, account transaction data, account balance data, and the like. The partner record may include the partner account.

The partner entity identification information may include data for the partnering entity associated with the user interface device 40, including, for example, entity name, entity address, contact name, contact email address, contact telephone number, entity identification number, IP address, MAC address, and the like.

The partner account transaction data may include a transaction history that contains, for each transaction event, e.g., the date of transaction event, time of transaction event, identification of the client (and/or communicating device 10) associated with the transaction event, identification of the user interface device 40 associated with the transaction event, details regarding the transaction event (e.g., description of dollar amount paid/deposited by the client (or communicating device 10)), and the like.

The partner account balance data may include account history, including all deposits, distributions, payments, and the like, from/to the partner account, dates and times of all such deposits, distributions, payments, and the like, and the account balance from creation of the partner account to present.

The user interface device 40 may include a transducer (not shown) such as, for example, an image pickup device that can capture an image of an object such as, for example, text, symbols, indicia, machine-readable code, or the like that can be provided on, for example, the client card or the communication device 10, or an RFID or NFC transducer that can receive and process the RFID or NFC signal generated by the communication device. The machine-readable code may include, for example, a one-dimensional (1D) barcode, a two-dimensional (2D) barcode, an interleaved code (e.g., numeric-only barcode), a data matrix code, a quick response (QR) code, or the like. A client can be provided a card containing, for example, a QR scan code containing client data that can be used by the admin server 20 to map to a specific user account in the database 250, or the machine-readable code may be downloaded to the communicating device 10.

Figure 5:
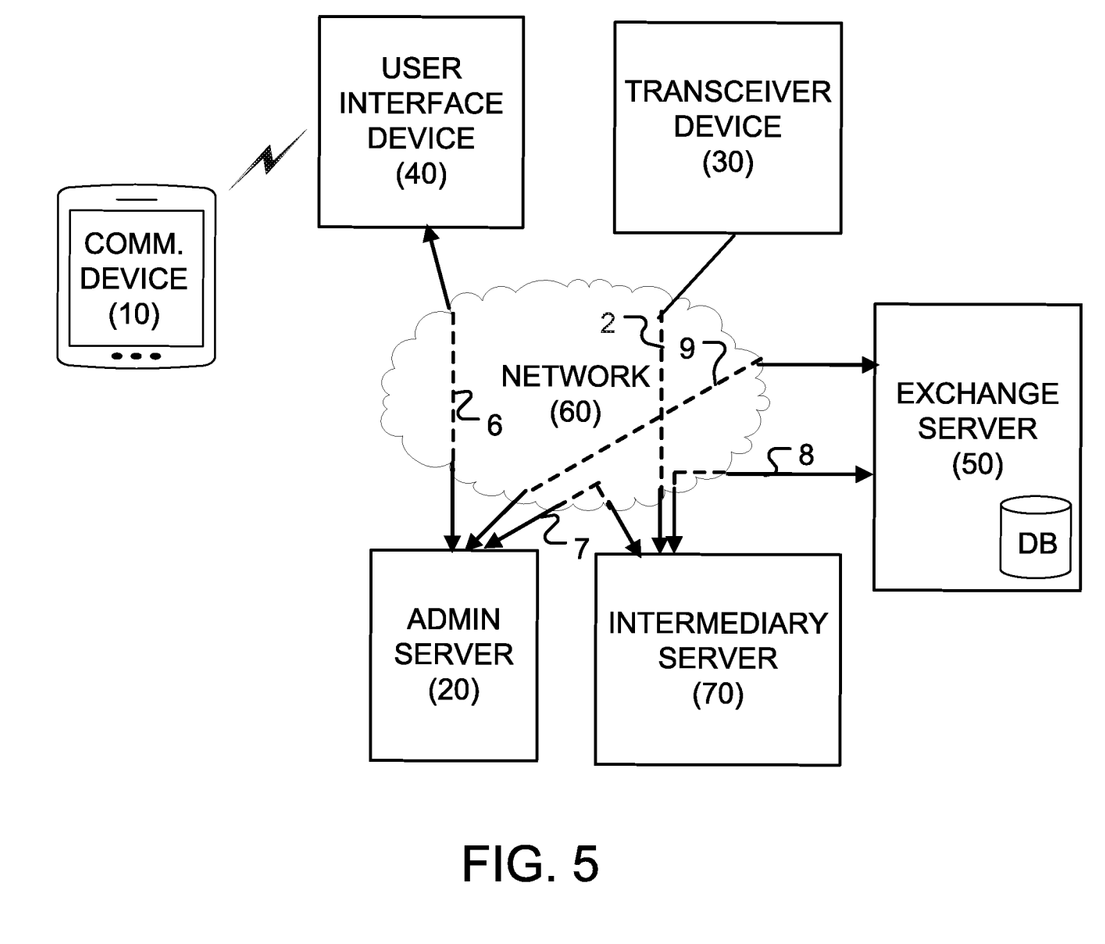
FIG. 5 shows an example of an open loop system implemented using an embodiment of the network communication system of FIG. 1.

FIG. 5 shows an open loop configuration, according to the principles of the disclosure. In the open loop embodiment, the admin server 20 may retain and maintain information related to the intermediary server 70, including an acquirer/merchant bank account of a financial entity (e.g., bank) that manages financial transactions on behalf of the transceiver device 30 or the entity that is associated with the transceiver device 30. As part of the process, the intermediary server 70 may interact with the admin server 20 over a communication link 7 to provide merchant information. The intermediary server 70 may interact with the transceiver device 30 over a communication link 2 to transmit transactions data related to the transceiver device 30 or the entity operating the transceiver device 30.

Figure 6:
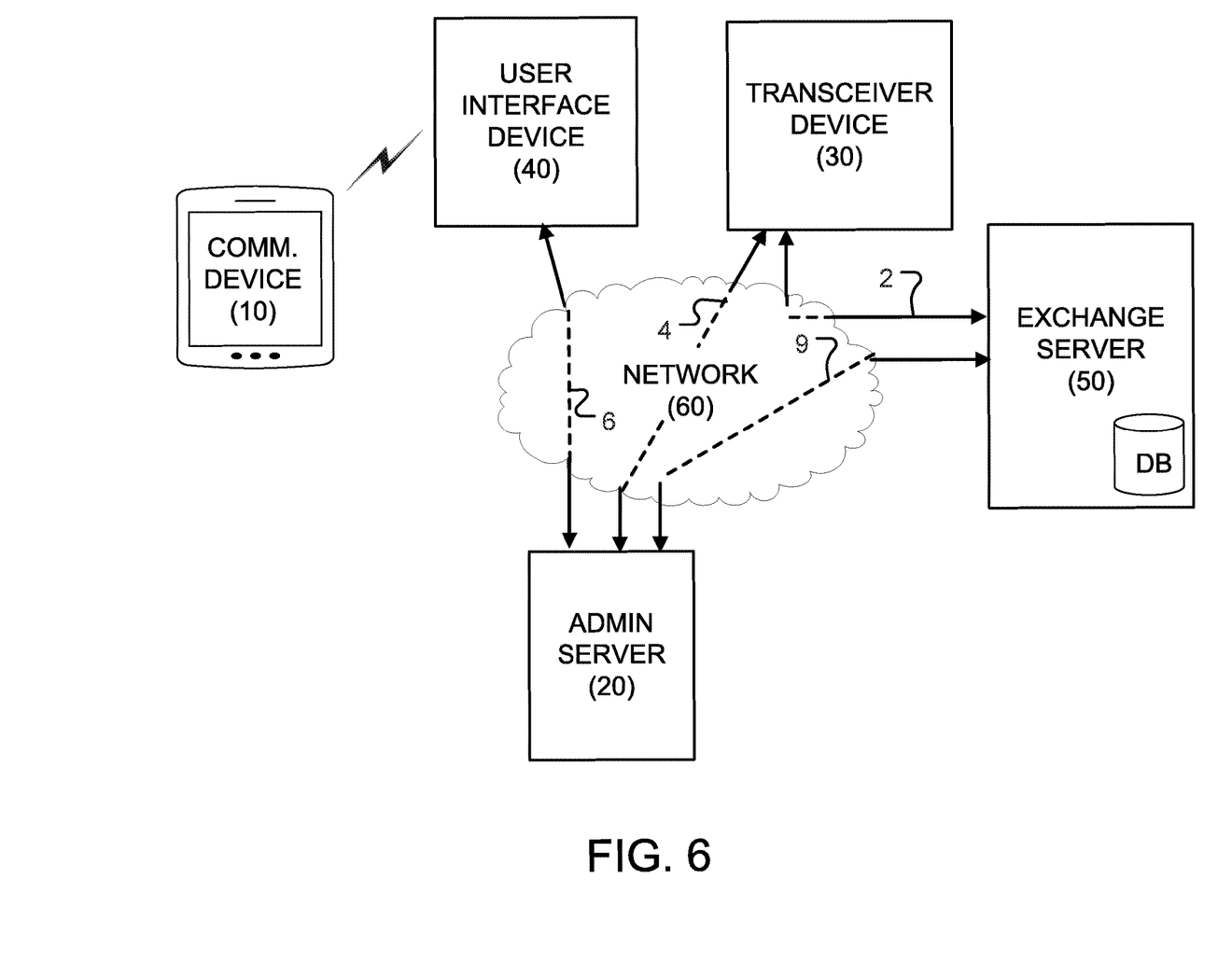
FIG. 6 shows an example of a closed loop system implemented using an embodiment of the network communication system of FIG. 1.

FIG. 6, shows a closed loop configuration, according to the principles of the disclosure. In the closed loop embodiment, the transceiver device 30 may communicate with the admin server 20 over a communication link 4 to create a merchant account and a merchant record that may be stored and maintained by the admin server 20 (e.g., in the database 250). As part of the process, the transceiver device 30 may interact with the admin server 20 to provide merchant information, merchant login information, merchant password information, and the like, so as to create and manage the merchant account and merchant record.

According to a non-limiting embodiment of the disclosure, the transceiver device 30 may include a computer of a government entity (e.g., the U.S. Post Office, Internal Revenue Service, or the like), a commercial entity (e.g., a utility company, a retailer, a service provider, or the like), or an individual (e.g., a person). The admin server 20 may collect and aggregate the necessary information from the transceiver device 30 (or intermediary server 70) to create and manage the merchant account and merchant record for the entity associated with the transceiver device 30. The merchant record may include merchant entity identification information, account transaction data, account balance data, IP address, device MAC address, and the like.

The merchant entity identification information may include data for the merchant entity associated with the transceiver device 30, including, for example, entity name, entity address, contact name, contact email address, contact telephone number, entity identification number, and the like. The merchant record may include the merchant account.

The merchant account transaction data may include transaction history, including, e.g., the date of each transaction event, time of each transaction event, identification of each client (and/or communicating device 10) associated with each transaction event, details regarding each transaction event (e.g., description of each item purchased/sold, price of each item, total number of items purchased/sold, taxes paid on each item(s) purchased/sold, etc.), and the like.

The merchant account balance data may include account history, including all deposits, distributions, payments, and the like, from/to the merchant account, dates and times of all such deposits, distributions, payments, and the like, and the account balance from creation of the merchant account to present.

Figure 3A:
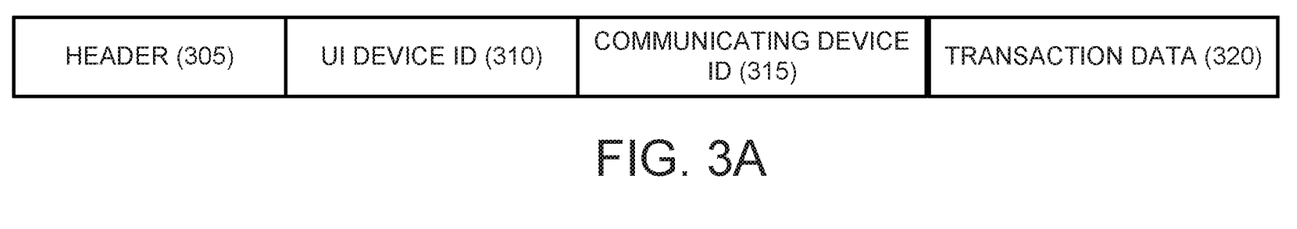
FIGS. 3A and 3B show examples of data packets that may be generated and transmitted as part of the communication signals from a user interface device (shown in FIG. 1) and a transceiver device (shown in FIG. 1), respectively.
Figure 3B:
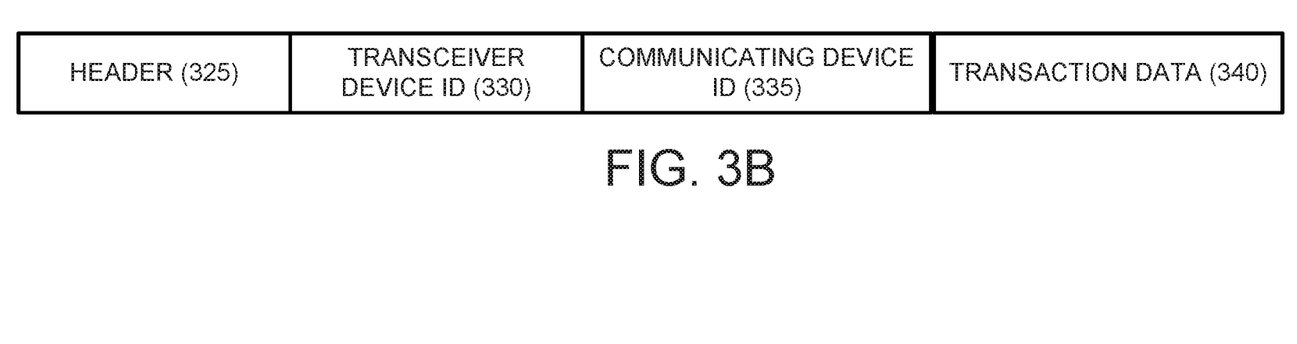
Figure 3C:
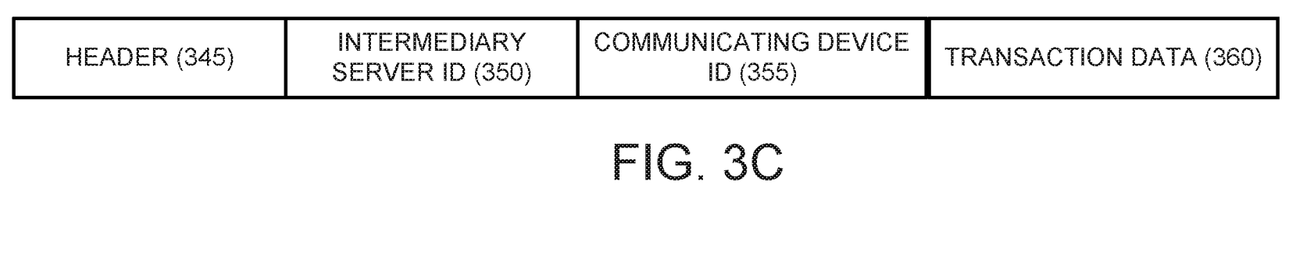
FIG. 3C shows an example of a data packet that may be generated and transmitted as part of a communication signal from an intermediary server in an open loop embodiment of the network communication system of FIG. 1.

FIGS. 3A and 3B show examples of data packets that may be generated and transmitted as part of the communication signals from the user interface device 40 (shown in FIG. 1) and the transceiver device 30 (shown in FIG. 1), respectively; FIG. 3C shows an example of a data packet that may be generated and transmitted as part of a communication signal from the intermediary server 70 on behalf of the transceiver device 30 (or the user of the transceiver device 30) in the open loop embodiment of the network communication system 1 (shown in FIG. 5).

Referring to FIGS. 1 and 3A, a client with a communicating device 10 may visit a physical or a virtual location of the user interface device 40 (such as, e.g., a point-of-sale (PoS) location) and charge up the user account (maintained by the admin server 20) with a predetermined deposit amount (e.g., $100) by depositing the funds with the user interface device 40 (or partnering user thereof). For instance, the client may give a $100 bill to the individual at a PoS location, or load the funds into an automated teller machine and scan a QR code on his/her client card or communicating device 10 using an image pickup device at the PoS location. The user interface device 40 may read the QR code and generate a data packet signal having data packets as shown in FIG. 3A, including the binary representation of the client reference data picked up from the QR code. The generated data packets include a header 305 and data packet payloads 310, 315, 320.

The header 305 may include data about the user interface device 40, the admin server 20, the communication channel 6 (shown in FIGS. 5 and 6) between the user interface device 40 and the admin server 20, and other data/information necessary to securely and reliably transmit and deliver the data packet to the admin server 20, including all necessary IP addresses, port numbers, and the like.

The data packet payload may include: user interface (UI) device identification (ID) data 310 that describes and identifies the user interface device 40; communicating device ID data 315 that describes and identifies the communicating device 10 (and/or client associated with the client device 10); and, transaction data 320 that provides detailed information about the transaction event, including the deposit date, deposit time, deposit location, deposit amount (e.g., $100), and the like. The communicating device ID data 315 may include the client reference data from the card or communicating device 10. The transaction data 320 may include a master admin account number, a master admin routing number, and the like, which may identify the unique master admin account held and maintained by the exchange server 50 for the admin server 20. The user interface device 40 may transmit the data packet to the admin server 20 over the communication channel 6 (shown in FIGS. 5 and 6).

Concurrently, or at a different time, the partnering user (or the user interface device 40) may deposit or transfer funds to the master admin account at the exchange server 50 via a secure channel 2 (shown in FIG. 6)—the deposited or transferred funds may equal the deposit amount (e.g., $100) received from the user, or the deposit amount less a predetermined processing fee charged by the partnering user, in which case the difference can be made up from the account in the exchange server 50 associated with the admin server 20. The funds transfer may be carried out by the user interface device 40 generating and sending a communication signal to the exchange server 50 over the channel 2, including instructions to the exchange server 50 to transfer funds in the amount of the deposit (e.g., $100) from a master account for the partnering user to the master admin account, both of which may be held and maintained by the exchange server 50.

The user interface device 40 may charge the client a charge fee (e.g., 0.75% or $0.75) to charge up the user account at the time of the transaction, in which case the admin server 20 may provide the difference (e.g. $0.75) to the user account so that the user account may have the full value (e.g., $100) that the client paid at the user interface device 40. This difference (e.g., $0.75) can be recovered at a later time, when the client purchases a product or service from the merchant associated with the transceiver device 30 via the client communicating device 10.

Figure 4:
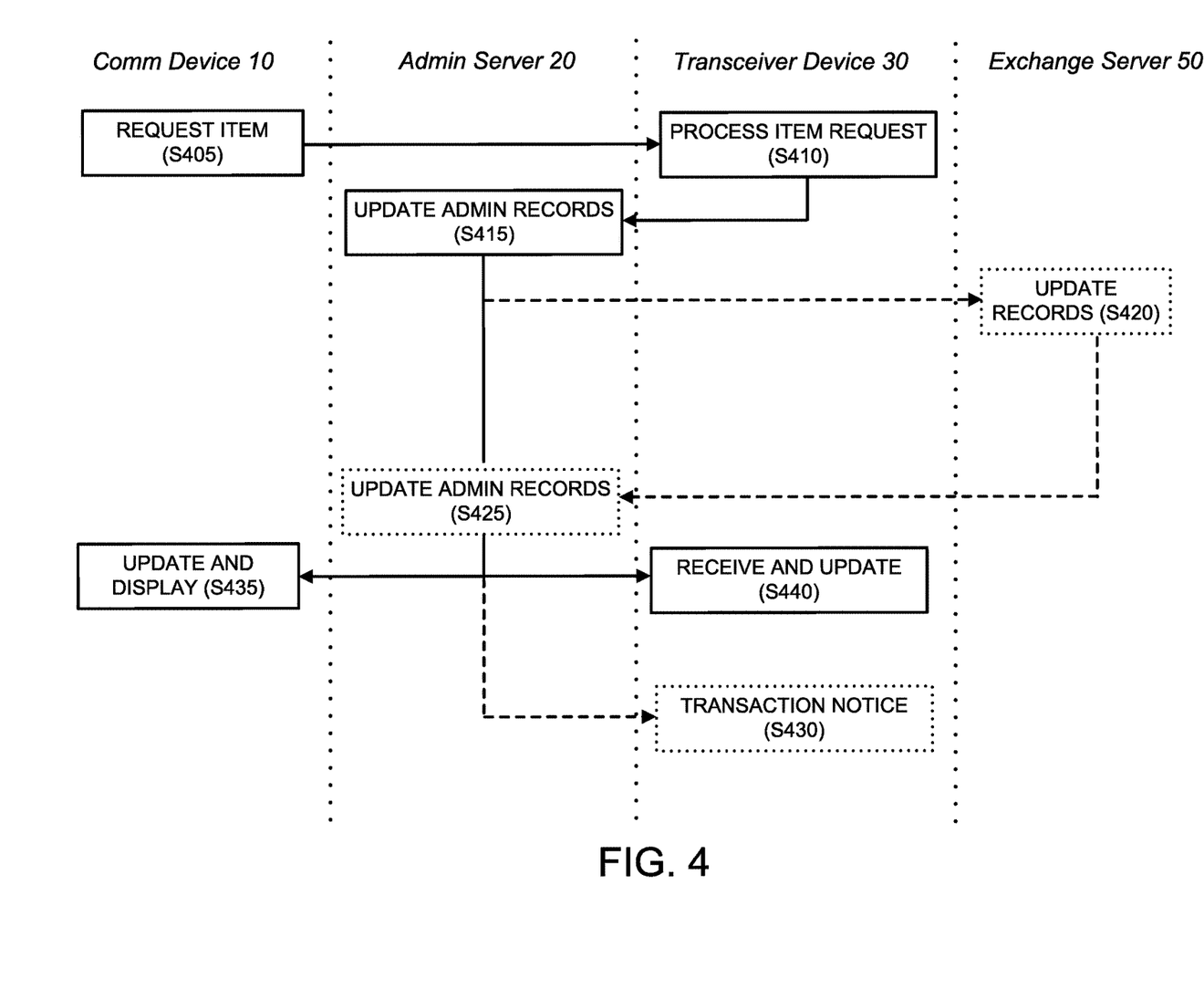
FIG. 4 shows an example of a transaction process that may be executed by the network communication system of FIG. 1.

FIG. 4 shows an example of a transaction process carried out by network communication system 1. Referring to FIGS. 1 and 4-6, after the user account is charged up with a predetermined deposit amount (e.g., $100), as described above with reference to FIG. 3A, the admin server 20 may update the user account and user record to reflect the deposit amount. The client may use the communicating device 10 to shop for and purchase items online or from physical locations (Step 405). As discussed above, the user may have charged up the user account by depositing the amount (e.g., $100) at a partner entity associated with the user interface device 40, which in turn would have deposited the amount directly (or by requesting transfer from the partner entity's master account) to a master admin account associated with the admin server 20 and held and maintained by the exchange server 50. Referring to FIG. 3A, a deposit notification message may be sent from the user interface device 40 to the admin server 20 over the channel 6 (shown in FIGS. 5 and 6) as part of the transmitted data packets—the notification message may be sent for each deposit event, or aggregated and sent as a batch job to the admin server 20.

Alternatively, the user account may have been charged up (e.g., at the instruction of the client by means of the client device 10) through, for example, direct deposit, in which case the predetermined amount would have been deposited directly to the master admin account held and maintained by the exchange server 50. A deposit notification message may be sent to the admin server 20 by the direct deposit source (not shown) or the exchange server 50, which may be sent for each event, or as part of a batch job with other notification messages.

After the communicating device 10 requests the item from the transceiver device 30 (Step 405), the transceiver device 30 may process the request (Step 410). In this regard, the communicating device 10 may request an item or service from the transceiver device 30 by, for example, accessing a website maintained by the transceiver device 30 and interfacing with the transceiver device 30 to request purchase of the desired item or service. The transceiver device 30 may process the request by, for example, retrieving and scheduling delivery of the requested item and completing a billing invoice for the transaction. Referring to FIGS. 1 and 3B, the transceiver device 30 may generate and transmit to the admin server 20 data packets comprising a header 325 and payloads 330, 335, 340 over a channel 4 (shown in FIG. 6).

The header 325 may include data about the transceiver device 30, the admin server 20, the communication channel 4 (shown in FIG. 6) between the transceiver device 30 and the admin server 20, and other data/information necessary to securely and reliably transmit and deliver the data packets to the admin server 20, including all necessary IP addresses, port numbers, and the like.

The data packet payload may include: transceiver device identification (ID) data 330 that describes and identifies the transceiver device 330 (and/or the merchant associated with the transceiver device 330); communicating device ID data 335 that describes and identifies the communicating device 10 (and/or client associated with the communicating device 10); and, transaction data 340 that provides detailed information about the transaction event, including the purchase/sale date, purchase/sale time, purchase/sale location, purchase/sale price, shipping cost, tax, description of item, number of items, total amount to be paid for the purchase/sale transaction (e.g., $100), and the like. The communicating device ID data 335 may include the client reference data captured from the card or communicating device 10. The transceiver device ID data 330 may include a merchant account number that is associated with merchant account and merchant record held and maintained by the admin device 20.

As previously noted, FIG. 3C shows an example of the data packet that may be generated and transmitted as part of a communication signal from the intermediary server 70 over a channel 7 (shown in FIG. 5) on behalf of the transceiver device 30 (or the user of the transceiver device 30) in the open loop embodiment of the network communications system 1 (shown in FIG. 5). The intermediary server 70 may include a computer or a communicating device or a server. In the open loop embodiment, according to an aspect of the disclosure, the admin server 20 does not include a merchant account nor merchant record associated with the transceiver device 30 (or the merchant user thereof). Rather, the admin server 20 holds and manages an account of an acquirer/merchant bank (not shown) that is associated with the intermediary server 70, which in turn holds/manages a bank account that is associated with the transceiver device 30 (or the merchant user thereof).

Referring to FIGS. 1, 3C, and 4, while the transceiver device 30 processes the request from the communicating device 10 as described above (Step 410), the transceiver device 30 can receive, among other things, admin account information, admin account routing information, and the communicating device ID data 350 from the communicating device 10 during the transaction event. Instead of sending the data packet shown in FIG. 3B to the admin server 20, the transceiver device 30 can transmit the captured data to the intermediary server 70 belonging to the acquirer/merchant bank associated with the transceiver device 30. The intermediary server 70 in turn can generate and transmit data packets, configured as shown in FIG. 3C, to the admin server 20 over the channel 7 (shown in FIG. 5). The transmitted data packets include a header 345 and payloads 350, 355, 360.

The header 345 may include data about the intermediary server 70 and/or the thirty-party acquirer/merchant bank, the transceiver device 30 (or the merchant user thereof), the admin server 20, the communication channel 7 (shown in FIG. 5) between the intermediary server 70 and the admin server 20, and other data/information necessary to securely and reliably transmit and deliver the data packets to the admin server 20, including all necessary IP addresses, port numbers, and the like.

The data packet payloads may include: third party device identification (ID) data 350 that describes and identifies the third party acquirer/merchant bank and/or its computer device; communicating device identification (ID) data 355, which may include the admin account information, admin account routing information, and the user device ID data received by the transceiver device 30 from the communicating device 10 during the transaction event (Step 410); and transaction data 360 that provides detailed information about the transaction event, including the purchase/sale date, purchase/sale time, purchase/sale location, purchase/sale price, shipping cost, tax, description of item, number of items, total amount to be paid for the purchase/sale transaction (e.g., $100), and the like. The total amount to be paid for the purchase/sale transaction data in transaction data 360 can include the total amount ($100) less a predetermined transaction value ($1.50 or 1.5%). The transaction data 360 may include an amount due value (e.g., $98.50) that is to be transferred to the merchant account.

After the transceiver device 30 processes the item request (Step 410), the admin server 20 receives a communication signal from the transceiver device 30 over the channel 4 in the closed loop embodiment (shown in FIG. 6), including data packets formatted as shown in FIG. 3B, and the admin server 20 updates the merchant account and merchant record based on the received data packets (Step 415), which may include adding a transfer value (e.g., $98.50) to the merchant account and simultaneously subtracting the total amount to be paid for the purchase/sale transaction (e.g., $100) from the user account, thereby carrying out transfer of funds (e.g., −$100) from the user account to the merchant account (e.g., +$98.50) and a revenue account (e.g., $1.50), less any amounts (e.g., $0.75) that were previously advanced to the user account to make up for the charge up fee (e.g., 0.75% or $0.75) charged at the user interface device 40. The admin server 20 may generate and transmit a communication signal to the communicating device 10, which includes an instruction signal to update and display the user account balance with information provided in the data signal (Step 435) and/or a communication signal to the transceiver device 30 to update the merchant account balance (Step 440).

Alternatively, in the open loop embodiment, the admin server 20 can update the third-party acquirer/merchant bank account and record based on a communication signal from the intermediary server 70 received over the channel 7 (shown in FIG. 5), which may include data packets formatted as shown in FIG. 3C (Step 415). Based on the received data packets (shown in FIG. 3C, including transaction data 340), the admin server 20 can generate and transmit an instruction signal to the exchange server 50 over the channel 9 (shown in FIG. 5) (Step 420). The instruction signal may comprise a Fedwire® instruction signal, an ISO 20022 compliant signal, or the like, that instructs the exchange server 50 to transfer funds from the master admin account for the admin server 20 to the acquirer/merchant bank account associated with the transceiver device 30. The admin server 20 may receive a confirmation communication signal from the exchange server 50 that confirms the transfer of funds from the master admin account to the third-party bank account related to the transceiver device 30 (Step 425). The admin server 20 may generate and transmit a communication signal to the transceiver device 30 or a third-party acquirer/merchant bank confirming transfer of funds (Step 430).

The terms "a," "an," and "the," as used in this disclosure, mean "one or more," unless expressly specified otherwise.

A "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation. The communicating device can be portable or stationary.

A "communication(s) link," as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G, 4G or 5G cellular standards, Bluetooth, or the like. A communication(s) link may include a virtual private network (VPN) channel, a public switched telephone network (PSTN) channel, a public land mobile network (PLMN) channel, a voice-over-Internet-Protocol (VoIP) channel, a satellite link, a cellular network link, an Internet protocol link, or the like. The Internet protocol may include an application layer (e.g., BGP, DHCP, DNS, FTP, HTTP, IMAP, LDAP, MGCP, NNTP, NTP, POP, ONC/RPC, RTP, RTSP, RIP, SIP, SMTP, SNMP, SSH, Telnet, TLS/SSL, XMPP, or the like), a transport layer (e.g., TCP, UDP, DCCP, SCTP, RSVP, or the like), an Internet layer (e.g., IPv4, IPv6, ICMP, ICMPv6, ECN, IGMP, IPsec, or the like), and a link layer (e.g., ARP, NDP, OSPF, Tunnels (L2TP), PPP, MAC (Ethernet, DSL, ISDN, FDDI, or the like), or the like).

A "computer" or a "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, server farms, computer clouds, or the like.

A "computer readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, Bluetooth, or the like.

A "database," as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

A "Network," as used in this disclosure, means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, a PSTN network, a PLMN network, the Internet, or the like, or any combination of the foregoing, any of which may be configured to communicate data via a wireless and/or a wired communication medium. These networks may run a variety of protocols not limited to TCP/IP, IRC or HTTP.

A "platform," as used in this disclosure, means any computer hardware, software, or combination of hardware and software, including, for example, computer hardware and operating system software.

A "server," as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation. The server may include a server farm, a computer cloud, or the like.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A network system, the system comprising:
   a transceiver device that receives a first data packet signal from a communicating device over a first communication link in a communication network and generates and transmits a second data packet signal over a second communication link in the communication network; and
   an admin server that receives the second data packet signal from the transceiver device over the second communication link in the communication network, updates a client record in a database based on one or more data packets in the second data packet signal, and transmits a third data packet signal over a third communication link in the communication network to an exchange server,
   wherein the exchange server updates a master database based on one or more data packets in the third data packet signal and transmits a fourth data packet signal, and
   wherein the master database comprises a master admin record associated with the admin server, and
   wherein the admin server updates a database record associated with the transceiver device, and
   wherein the third data packet signal comprises a Fedwire instruction signal to the exchange server to transfer a predetermined value from the master admin record to another record in the master database.
2. The network system in claim 1, wherein the system comprises a closed loop infrastructure.
3. The network system in claim 1, wherein the master database comprises a master admin record associated with the admin server system comprises an open loop infrastructure.
4. The network communication system in claim 1, wherein at least one of the first communication link, second communication link and third communication link in the communication network comprises a virtual private network (VPN) channel.
5. A network system, the system comprising:
   an intermediary server that receives a first data packet signal from a transceiver device over a first communication link in a communication network and generates and transmits a second data packet signal over a second communication link in the communication network;
   an admin server that receives the second data packet signal from the intermediary server over the second communication link in the communication network, updates a client record in a database based on one or more data packets in the second data packet signal, and transmits a third data packet signal over a third communication link in the communication network to an exchange server,
   wherein the exchange server updates a master database based on one or more data packets in the third data packet signal, and
   wherein network system comes a closed loop infrastructure.
6. The network system in claim 5, wherein the system comprises an open loop infrastructure.
7. The network system in claim 5, wherein the master database comprises a master admin record associated with the admin server.
8. The network system in claim 7, wherein the third data packet signal comprises a Fedwire instruction signal to the exchange server to transfer a predetermined value from the master admin record to another record in the master database.
9. The network communication system in claim 5, wherein at least one of the first communication link, second communication link and third communication link in the communication network comprises a virtual private network (VPN) channel.
10. A non-transitory computer readable medium having stored thereon machine executable code which, when executed by at least one computing device, causes the at least one computing device in a network system to perform steps comprising:
    receiving, by a transceiver device, a first data packet signal from a communicating device over a first communication link in a communication network;
    generating, by the transceiver device, a second data packet signal;
    transmitting, by the transceiver device, the second data packet signal over a second communication link in the communication network;
    receiving, by an admin server, the second data packet signal from the transceiver device over the second communication link in the communication network;
    updating, by the admin server, a client record based on one or more data packets in the second data packet signal;
    generating, by the admin server, a third data packet signal;
    transmitting, by the admin server, the third data packet signal over a third communication link in the communication network to an exchange server, wherein the exchange server updates a master database based on one or more data packets in the third data packet signal, and wherein the admin server updates a database record associated with the transceiver device, and wherein the network system comprises a closed loop infrastructure.

11. The non-transitory computer readable medium in claim 10, wherein the master database comprises a master admin record associated with the admin server.

12. The non-transitory computer readable medium in claim 10, wherein the third data packet signal comprises a Fedwire instruction signal to the exchange server to transfer a predetermined value from the master admin record to another record in the master database.

13. The non-transitory computer readable medium in claim 10, wherein at least one of the first communication link, second communication link and third communication link in the communication network comprises a virtual private network (VPN) channel.

\* \* \* \* \*